United States Patent
Mehta et al.

(10) Patent No.: US 7,293,155 B2
(45) Date of Patent: Nov. 6, 2007

(54) MANAGEMENT OF ACCESS TO DATA FROM MEMORY

(75) Inventors: Kalpesh Dhanvantrai Mehta, Chandler, AZ (US); Wen-Shan Wang, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 365 days.

(21) Appl. No.: 10/449,316

(22) Filed: May 30, 2003

(65) Prior Publication Data

US 2004/0250042 A1 Dec. 9, 2004

(51) Int. Cl.
G06F 12/00 (2006.01)
(52) U.S. Cl. .................. 711/206; 711/214; 711/217; 711/218
(58) Field of Classification Search ............... 711/206, 711/214, 217, 218, 221
See application file for complete search history.

(56) References Cited

U.S. PATENT DOCUMENTS

| 3,634,828 | A * | 1/1972 | Myers et al. ............... 358/1.3 |
| 4,935,867 | A * | 6/1990 | Wang et al. ............... 711/217 |
| 5,206,940 | A * | 4/1993 | Murakami et al. ........ 711/218 |
| 6,021,473 | A * | 2/2000 | Davis et al. ............... 711/141 |
| 6,180,864 | B1 * | 1/2001 | Furuhashi et al. ......... 84/603 |
| 6,260,082 | B1 * | 7/2001 | Barry et al. ............... 710/22 |
| 6,279,096 | B1 * | 8/2001 | McCoy et al. ............. 711/211 |
| 6,397,324 | B1 * | 5/2002 | Barry et al. ............... 712/225 |
| 6,453,367 | B2 * | 9/2002 | Barry ......................... 710/26 |
| 6,453,402 | B1 * | 9/2002 | Jeddeloh .................... 711/167 |
| 6,457,073 | B2 * | 9/2002 | Barry et al. ............... 710/22 |
| 6,463,518 | B1 * | 10/2002 | Duboc ....................... 711/220 |
| 6,581,152 | B2 * | 6/2003 | Barry et al. ............... 712/24 |
| 2002/0004916 | A1 * | 1/2002 | Marchand et al. ......... 713/322 |
| 2004/0153524 | A1 * | 8/2004 | Kang et al. ................ 709/213 |

OTHER PUBLICATIONS

Jean-Loup Baer, "Computer System Architecture," Computer Science Press, 1980, pp. 379-380.*

* cited by examiner

*Primary Examiner*—Matthew Kim
*Assistant Examiner*—Sheng-Jen Tsai
(74) *Attorney, Agent, or Firm*—Blakely, Sokoloff, Taylor & Zafman LLP

(57) ABSTRACT

Arbitrary patterns of address locations of digital data can be efficiently read from a memory of a signal processor. For example, a first memory address generator receives a first memory command signal from a first communication register to retrieve a first set of data from memory according to a look up table of memory addresses. The first memory access generator reads the look up table of memory addresses, which contain a second set of memory commands and reroutes the second set of commands to a bypass register. In turn, the second set of memory commands stored at the bypass register are read by a second memory address generator which retrieves a second set of data from memory according to the second set of memory command signals read out of memory by the first memory address generator.

28 Claims, 10 Drawing Sheets

US 7,293,155 B2

MANAGEMENT OF ACCESS TO DATA FROM MEMORY

FIELD

Digital signal processor access of data from memory.

BACKGROUND

Signal processing, such as still or video image signal processing, often involves one or more digital signal processors for processing data from memory. For example, a single digital signal processor having an embedded microprocessor controller, or multiple digital signal processors in a master/slave relationship have been used. The data manipulated by a digital signal processor or processors often originates from a computer memory that the processor or processors access, and is manipulated by circuitry including a second smaller memory at each processor.

BRIEF DESCRIPTION OF THE DRAWINGS

Various features, aspects and advantages will become more thoroughly apparent from the following detailed description, the set claims, and accompanying drawings in which:

DETAILED DESCRIPTION

Figure 1A:
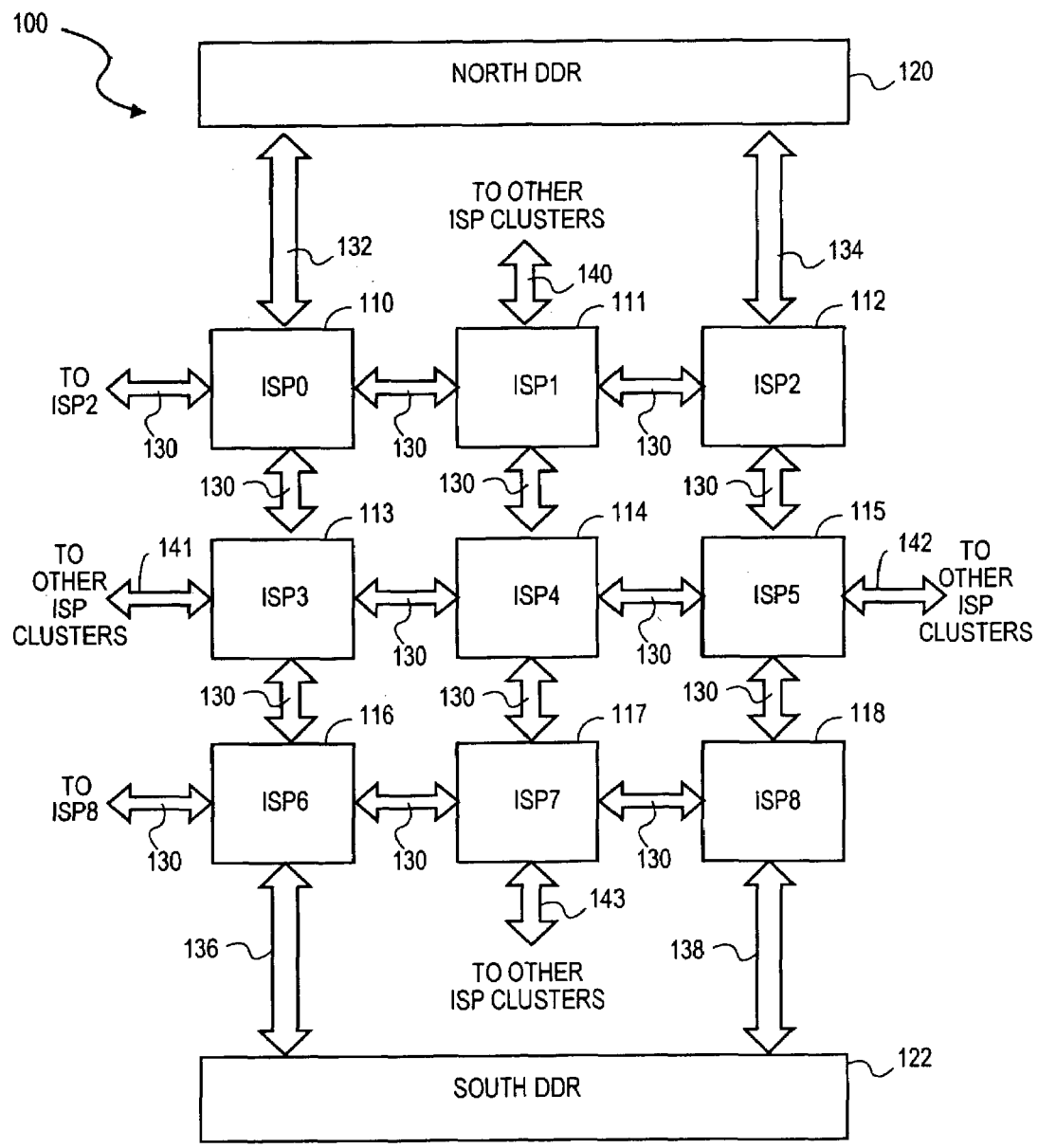
FIG. 1A is a block diagram of a cluster of nine interconnected image signal processors (ISP) coupled to double data rate (DDR) random access memory (RAM) and having interfaces for coupling to other ISP clusters.

Various embodiments of the invention relate to reading and writing digital data between a plurality of communication registers and memory of a signal processor, using a memory command handler. For example, FIG. 1A is a block diagram of a cluster of nine interconnected image signal processors (ISP) coupled to double data rate (DDR) random access memory (RAM) (e.g., such as DDR Synchronous Dynamic (SD) RAM) and having interfaces for coupling to other ISP clusters. FIG. 1A shows signal processing system 100 having a cluster of nine digital signal processors, also referred to as "image signal processors" (ISP), where each signal processor is coupled to at least one other signal processor and may also be coupled to one or more various types of memories and/or other signal processing clusters (e.g., such as other signal processing systems similar to system 100). For example, a hierarchical image processing image architecture similar to system 100 can be used for image processing related to a copier, a scanner, a printer, or other image processing device including to process a raster image, a Joint Photographic Experts Group (JPEG) image, a Moving Picture Experts Group (MPEG) image, or other digital image data.

As shown in the first row of signal processors of FIG. 1A, ISP0 110 is coupled to ISP1 111 via ISP coupling 130, and is coupled to ISP2 112 and ISP3 113 via other ISP couplings 130. In addition, ISP0 110 is shown coupled to north DDR RAM (north DDR) 120 via north DDR coupling 132. For example, a DDR memory may store digital image data, such as a complete image or complete images. In addition to being coupled to ISP0 110 as explained above, ISP1 111 is also coupled to ISP2 112 and ISP4 114 via other ISP couplings and may be coupled to other ISP clusters (e.g., such as other signal processing systems similar to system 100) via other ISP cluster coupling 140. In addition to the couplings described above, ISP2 112 is also coupled to ISP5 115 via an ISP coupling and coupled to north DDR 120 via north DDR coupling 134.

In the second row of signal processors in addition to the couplings above, ISP3 113 is coupled to ISP4 114 and ISP6 116 via ISP couplings and may be coupled to another ISP cluster via ISP cluster coupling 141. In addition to the couplings described above, ISP4 114 is coupled to ISP5 115 and ISP7 117 via ISP couplings. Furthermore, in addition to couplings described above, ISP5 115 is coupled to ISP8 118 via an ISP coupling and may be coupled to another ISP cluster via other ISP cluster coupling 142.

Next, in the third row of signal processors, ISP6 116 is coupled to ISP8 118 and ISP7 117 via an ISP coupling and may be coupled to south DDR RAM (south DDR) 122 via south DDR coupling 136, in addition to the couplings described above. Moreover, in addition to the couplings described above, ISP7 117 is coupled to ISP8 118 via an ISP coupling and may be coupled to another ISP cluster via other ISP cluster coupling 143. Finally, besides the couplings described above, ISP8 118 is also shown coupled to south DDR via south DDR coupling 138.

Although nine signal processors (e.g., ISPs) are shown in FIG. 1A, the number of signal processors can be increased or decreased to more or fewer than nine in other embodiments without any significant change in the system architecture. Moreover, in other embodiments, the type of couplings to each ISP may be varied. For example, ISP0 may be coupled to an ISP of another ISP cluster, instead of to ISP2 via coupling 130. Similarly, ISP3 may be coupled to ISP5 instead of coupled to another ISP cluster via coupling 141.

Figure 1B:
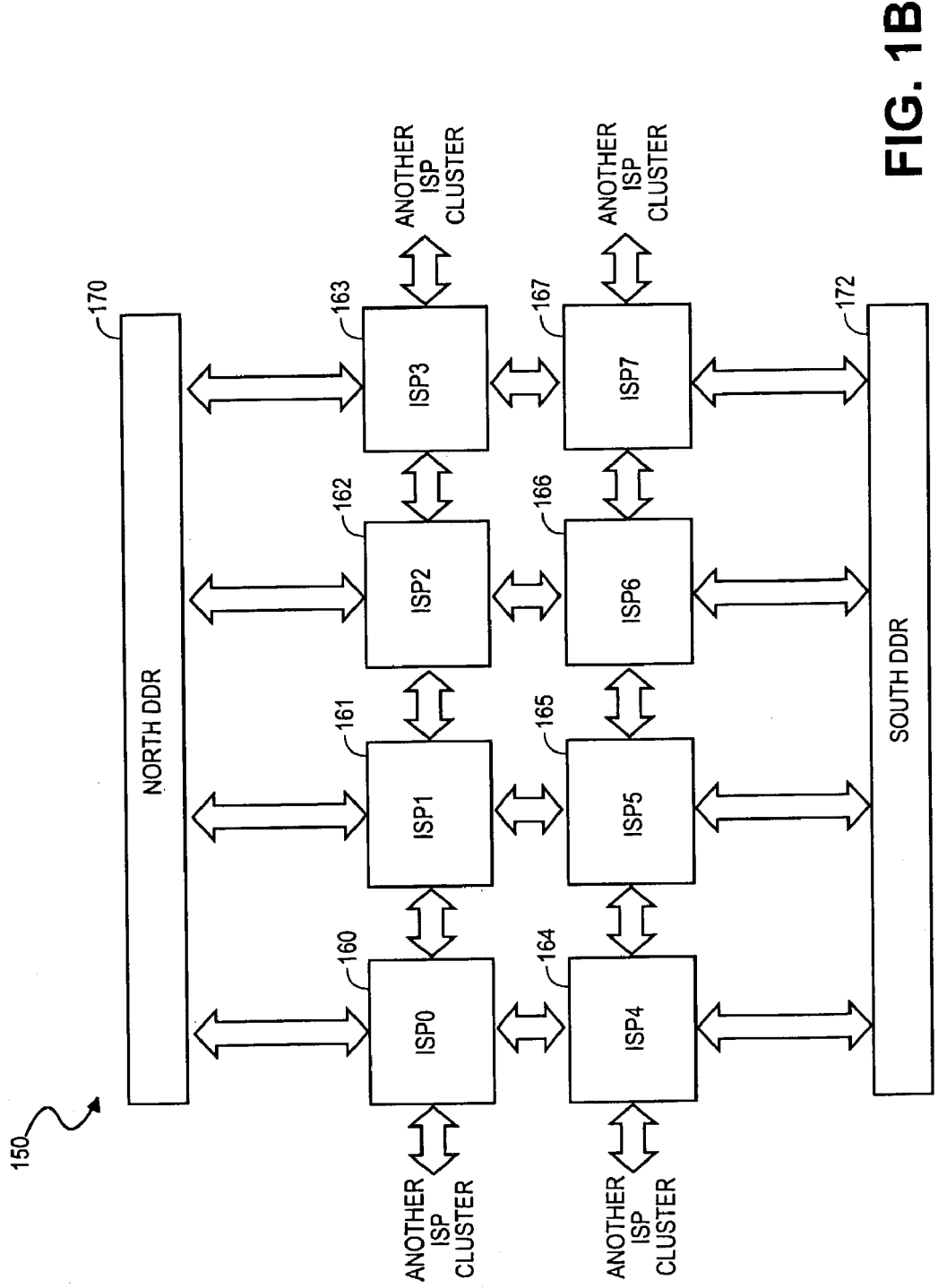
FIG. 1B is a block diagram of a cluster of eight interconnected ISPs coupled to DDRs and having interfaces for coupling to other ISP clusters.

Specifically, for example, FIG. 1B is a block diagram of a cluster of eight interconnected ISPs coupled to DDRs and having interfaces for coupling to other ISP clusters. For example, FIG. 1B shows signal processing system 150 having a cluster of eight signal processors arranged in two rows of four signal processors. As shown, ISP0 160 is coupled to ISP1 161, ISP4 164, an ISP of another cluster, and north DDR 170. In turn, ISP1 161 is also coupled to ISP2 162, ISP5 165, as well as to north DDR 170. Next, ISP2 162 is additionally coupled to ISP3 163, ISP6 166, as well as to north DDR 170. Next, IPS3 163 is also coupled to ISP7 167, an ISP of another cluster, and north DDR 170. The lower row of signal processors is coupled in a mirror image structure to that described above with respect to signal processors 0-3 except that the lower row is coupled to south DDR 172. Note. that although ISPs are shown and described with respect to FIGS. 1A and 1B, according to embodiments, the ISPs may include signal processors, digital signal processors, or various other appropriate signal processors coupled together to create a signal processing system having at least one signal processor that has functionality, as described herein.

Figure 2:
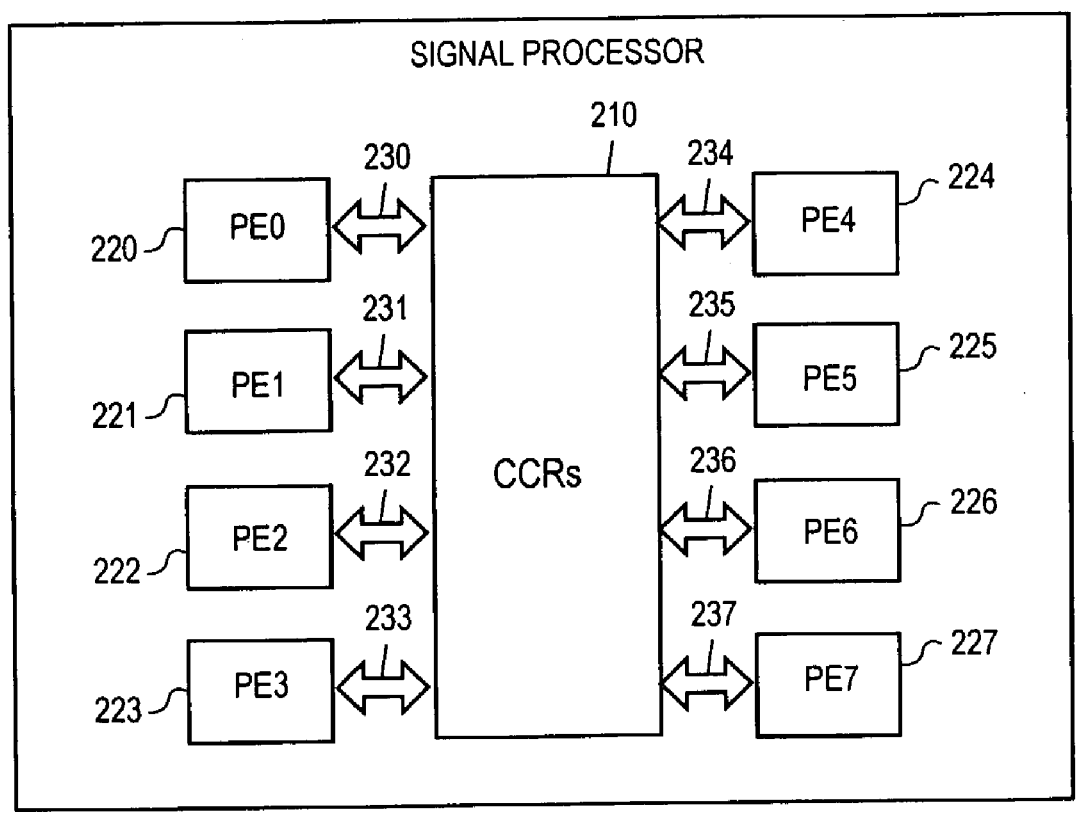
FIG. 2 is a block diagram of a signal processor showing eight processing elements (PEs) intercoupled to each other via cluster communication registers (CCRs), according to one embodiment of the invention.

FIG. 2 is a block diagram of an ISP showing eight processing elements (PEs) intercoupled to each other via cluster communication registers (CCRs), according to one embodiment of the invention. As shown in FIG. 2, the signal processor includes eight programmable processing elements (PEs) coupled to cluster communication registers (CCRs) 210. Specifically, PE0 220 is coupled to CCRs 210 via PE CCR coupling 230, PE1 221 is similarly coupled via PE CCRs 231, PE2 222 via coupling 232, PE3 223 via coupling via 233, PE4 224 via coupling 234, PE5 225 via coupling 235, PE6 226 via coupling 236, and PE7 227 is coupled to CCRs 210 via coupling 237. According to embodiments, CCRs for coupling each PE to every other PE, may have various electronic circuitry and components to store data (e.g., such as to function as a communication storage unit, a communication register, a memory command register, a command input register, or a data output register as described herein). Such electronic circuitry and components may include registers having a plurality of bit locations, control logic, logic gates, multiplexers, switches, and other circuitry for routing and storing data.

Moreover, from one to three of the PEs (e.g., PE5 and PE6) may be configured as hardwired accelerators, and one of the PEs (e.g., PE7 227) may be configured as a memory command handler (MCH) functioning as a special hardwired accelerator to manage the data flow for the other PEs in and out of a local memory (this MCH should not be confused with the MCH component in processor chipsets). Thus, for example, an embodiment may include a cluster of five PEs (e.g., PE0-PE4), two hardwired accelerators (e.g., PE5 and PE6), and one MCH (e.g., PE7) interconnected through a shared memory core (e.g., implemented CCRs 210). More particularly, according to embodiments, the PEs, hardwired accelerators, and MCH in a signal processor can communicate with each other through a plurality of CCRs (e.g., CCRs 210 may include sixteen CCRS), where each CCR is coupled to each PE, each hardwired accelerator, and the MCH.

Further, in embodiments, the MCH has an interface for simultaneously reading and writing data to and from all of the CCRs. In addition, each of the five processing elements has an interface that allows that PE to simultaneously read from up to two different CCRs while simultaneously writing to any one of the CCRs, by using the registers of any of the CCRs as local address space. For instance, a plurality of the CCRs can be shared by and mapped to the address space of each processing element, where each communication register couples a first of the plurality of processing elements to every other one of the processing elements. Thus, data can be written to a selected communication register by a processing element and stored in the selected communication register to be read by at least one other processing element (although it is also possible for a processing element to write to itself via this process). Moreover, although one embodiment specifies sixteen CCRS, more or fewer than sixteen CCRs may be used.

Figure 3:
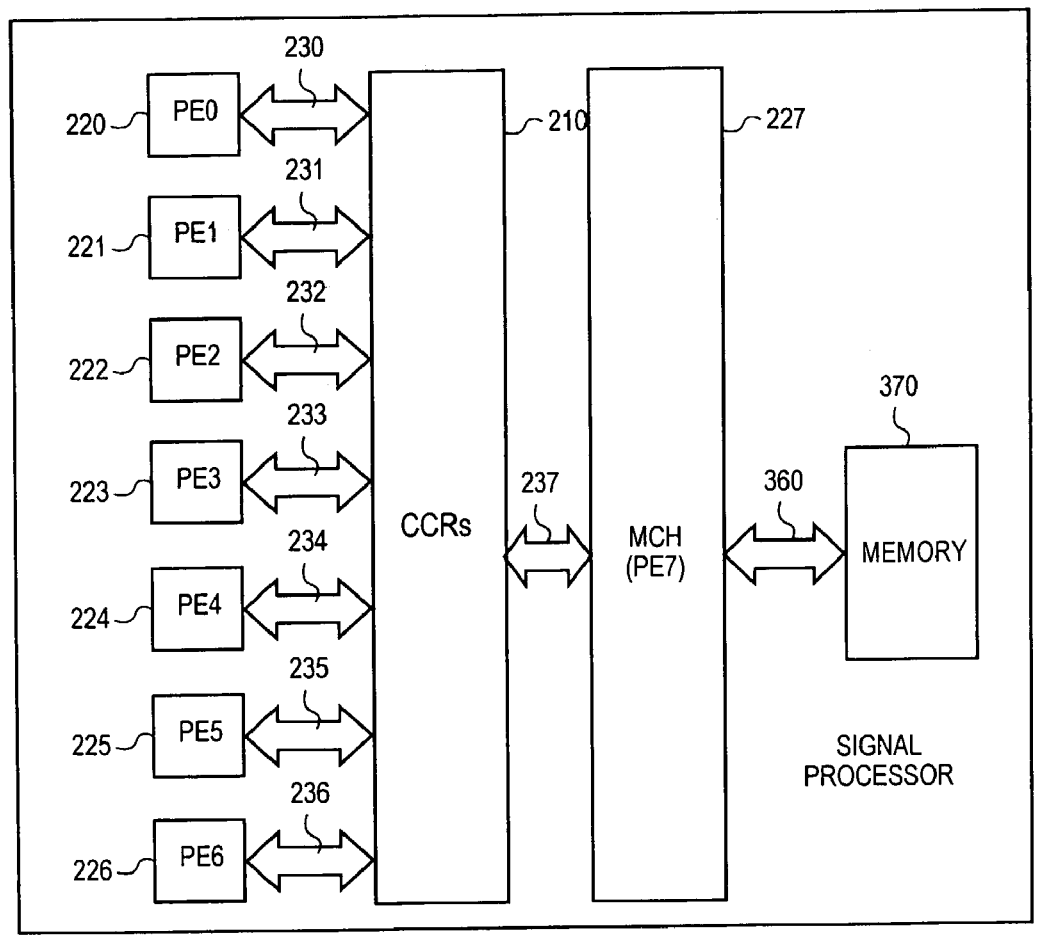
FIG. 3 is a block diagram of a memory command handler (MCH) coupled between a memory and the CCRs for retrieving data from the memory for use by the PEs, according to one embodiment of the invention.

Embodiments include CCRs having sixteen data bit locations and coupled to PEs via sixteen bit wide data paths, such as for image processing of pixels represented by a subsampled color spaced in sixteen bits (e.g., such as a subsampled color spaced YU, YV, or La, Lb, or YCr, YCb, etc.). For example, FIG. 3 is a block diagram of a memory command handler (MCH) coupled between a memory and the CCRS, for retrieving and writing data from and to the memory for use by the PEs, according to one embodiment of the invention. As shown in FIG. 3, MCH 227 (e.g., PE7 configured and interfaced to function as a memory control handler, as described above with respect to FIG. 2) is coupled via MCH to CCR coupling 237 (e.g., coupling 237, as described above with respect to FIG. 2) to CCRs 210 which in turn are coupled to each of PE0 220 through PE6 226 via CCR PE0 coupling 230 through CCR PE6 coupling 236. In addition, MCH 227 is coupled to memory 370 via MCH memory coupling 360.

According to embodiments, memory 370 may be a static RAM (SRAM) type memory, or memory 370 may be a type of memory other than SRAM. Typically, a DDR memory (e.g., such as north DDR 120, or 170; or south DDR 122 or 172) is a larger memory than memory 370. For example, a DDR memory may store digital image data, such as a complete image or complete images. On the other hand, memory 370 may be a local signal processor memory used for storing portions of images and/or for storing data temporarily. Thus, memory 370 may be an SRAM MCH memory, similar to a cache memory, used to temporarily store portions of images or complete image data that may originate from a DDR and may be staged in MCH 227.

Moreover, FIG. 3 shows CCRs 210 may be interfaced between MCH 227 and the PEs (e.g., PE0 220-PE6 226, which may include hardwired accelerators and processing elements). Therefore, it is possible for the PEs to read twice (e.g., such as from any two CCRs) and write once (e.g., such as to any single CCR) in a signal clock cycle, and for MCH 227 to function as a central resource able to read data from and write data to all CCRs (e.g., such as sixteen CCRS, numbered CCR0 through CCR15, some of which will be described below and shown in FIGS. 5 and 6) in a single clock cycle.

Figure 4:
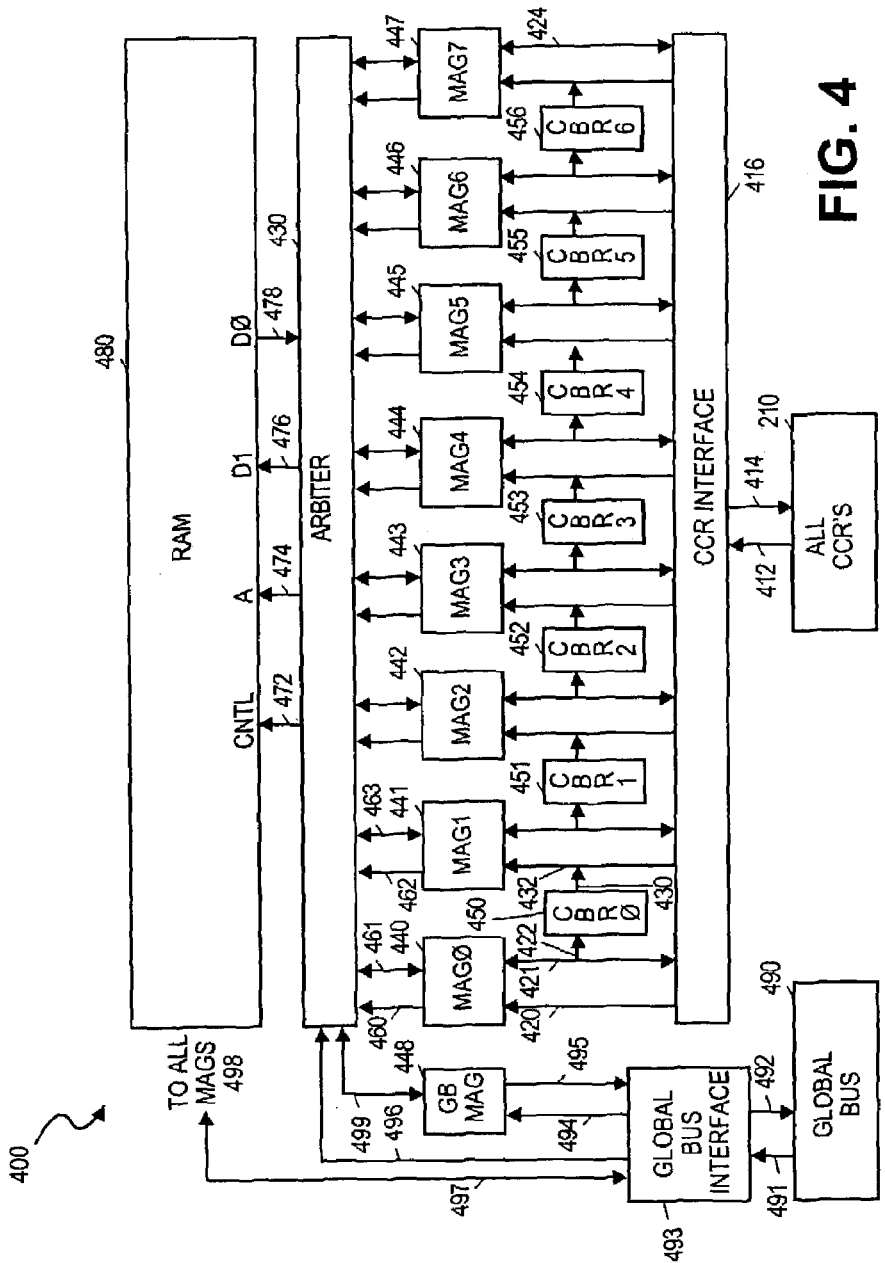
FIG. 4 is a block diagram of the MCH between a memory and the CCRs showing memory address generators (MAGs) and command bypass registers (CBRs) between adjacent MAGs, according to one embodiment of the invention.

As described above, MCH 227 may include a specific MAG interface for reading and writing to each of the CCRs. For example, FIG. 4 is a block diagram of the MCH between a memory and the CCRs showing memory address generators (MAGs) and command bypass registers (CBRs) between adjacent MAGs, according to one embodiment of the invention. FIG. 4 shows all CCRs 210 coupled to CCR interface 416 via MCH CCR read line 412 and MCH CCR write line 414. For instance, CCR interface 416 may allow all CCRs 210 to send memory commands for retrieving data from and writing data to memory, and to return data retrieved from and provide data to be written to memory via eight memory address generators (MAGs). For example, as shown in FIG. 4, MAG0 440 through MAG7 447 may receive command signals via MAG command signal input lines, such as MAG0 command signal input line 420 and MAG1 command signal input line 432, to command the MAGs to retrieve data from and write data to memory. In addition, each MAG may use a memory data read/write line, such as MAG0 memory data read/write line 421 and MAG7 memory data read/write line 424 to transit data from the CCRs to be written to memory, and transmit data read or retrieved from memory to the CCRs.

Furthermore, arbiter 470 may be coupled to each MAG via a MAG arbiter read/write signal line, such as MAG0 arbiter read/write signal line 460, to receive a data read signal providing the arbiter with information for accessing data from or writing data to memory. Also, the arbiter may be coupled to each MAG by a MAG arbiter I/O data line, such as MAG0 arbiter I/O data line 461, so that arbiter 470 can return data read from memory to, or write data to memory from, a requesting MAG, in accordance with the read/write signal. Next, arbiter 470 may be coupled to global bus MAG 448 via global bus MAG interface 499 and may be coupled to global bus interface 493 via global bus interface coupling 496. In turn, global bus MAG 448 may be coupled to global bus interface 493 via global bus interface read line 494 and global bus interface write line 495. Global bus interface 493 is coupled to each of MAG0 440 through MAG7 447 via all MAG coupling 497, as shown coupled to all MAGs element 498. Next, global bus interface 493 is interfaced to global bus 490 via global read line 491 and global bus write line 492. RAM 480 (e.g., such as memory 370, described above), is coupled to arbiter 470 via RAM control line 472, RAM addressing line 474, write memory data line 476 and read memory data line 478.

In addition, coupled between the memory data output line of each of MAG0 440 through MAG6 446 and the MAG command signal input line of each adjacent of MAG1 441 through MAG7 447, respectively, is a command bypass register (CBR). For example, CBR0 450 is shown coupled to MAG0 memory data I/O line 421 via CBR bypass input line 422, and coupled to MAG1 signal input line 432 via CBR bypass output line 430. Thus, it is possible for the memory data output of each MAG to either be routed to the CCR interface for writing to a CCR, or to be routed to a CBR. Moreover, it is also possible for the MAG command signal input line of each MAG to be switched to read data either in from a CCR via CCR interface 416 or from the adjacent CBR.

Although the embodiment shown in FIG. 4 does not include a CBR coupled to the MAG0 command signal input line, or a CBR coupled to the MAG7 memory data output line, it is possible to include a CBR between these positions. For example, it is possible to put an additional CBR coupled between the MAG7 memory data output line 424 and the MAG0 command signal input line 420 so that memory data output from MAG7 may be bypassed from the CCRs and CCR interface 416 and passed directly to the command input line of MAG0.

Moreover, other command bypass register configurations are contemplated, such as configurations including CBR0, CBR2, CBR4, and CBR6 without CBR1, CBR3, or CBR5. Thus, according to this configuration, a bypass would exist between MAG0 and MAG1, MAG2 and MAG3, MAG4 and MAG5, and MAG6 and MAG7.

Consequently, for any pair of MAGs (e.g., first and second MAG) with a CBR coupled between them, as described herein, a first memory address generator of the memory command handler may receive a first memory command signal from a first communication register and retrieve a first set of memory data from memory, according to the first memory command signal. The first memory address generator may access a look up table of memory addresses in memory containing a second set of memory commands. For instance, a "look up table" can be a set or predetermined pattern of addresses in memory (e.g., such as memory addresses 100, 101, 102, . . . , and 163; addresses 202, 204, 206, . . . , and 400; or addresses 100, 105, 103, 108, 106, 111, 109, . . . , and 121) corresponding to data locations having data that is or can be decoded into a second set of memory commands (e.g., such as a second set of memory commands for reading a second pattern of data from a memory). The first set of memory data having the second set of memory commands may then be rerouted to a bypass register instead of being returned to a communication register. In turn, the first set of memory data containing the second set of memory commands may be read by a second memory address generator instead of a command signal from a communication register. Thus, the second memory address generator may retrieve a second set of data from memory according to the second set of memory command signals read out of memory by the first memory address generator without passing the retrieved second set of memory commands to a communication register for subsequent retrieval by the second memory address generator.

As shown in FIG. 4, it is possible for data read from memory by MAG0 to be passed to the command input of MAG1 and for MAG1 to read data from memory in accordance with the memory data output from MAG0; then for the memory data output of MAG1 to be bypassed to the memory command input of MAG2 so that the data read from memory by MAG2 is in accordance with the memory data output from MAG1; and so on through to MAG7. If this bypassing is propagated from MAG0 to MAG7, it is possible for the data read to be an eighth dimensional data read, in accordance with the seventh dimensional data command received from MAG6 via CBR6 456. Next, in the embodiment described above having CBR0, CBR2, CBR4, and CBR6, it is possible to read a two dimensional memory address pattern at MAG1, in accordance with the MAG0 memory data output, but it is not possible to pass the MAG1 memory data output line to MAG2 to provide a three dimensional data read without sending the MAG1 memory data output to the CCRs first. Hence, in the CBR0, CBR2, CBR4, and CBR6 embodiment, the bypass registers only provide for two dimensional data pattern reading at MAG1, MAG3, MAG5, and MAG7.

Although FIG. 4 shows CBRs coupling memory data output lines to memory command signal input lines, embodiments include one or more bypass storage units for providing the functionality of the CBRs, as described herein. For example, appropriate bypass storage units may include one or more of the following: a bypass register; a register having a plurality of bit locations; control logic; logic gates; switches; multiplexers; and/or other circuitry for storing data.

Figure 5:
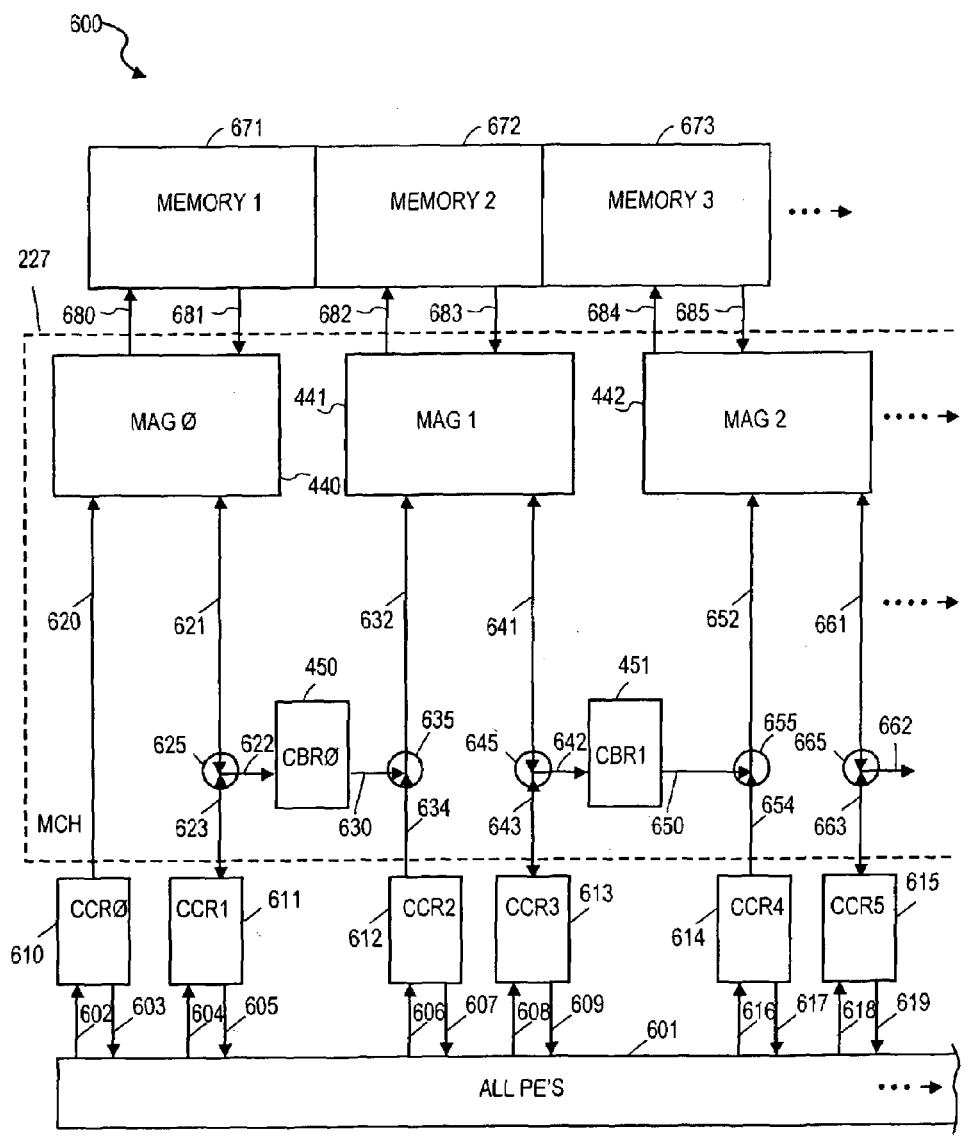
FIG. 5 is a block diagram of MAGs between memories and CCRs and CBRs showing the data paths for the command signals and data signals, according to one embodiment of the invention.

According to embodiments, a determination is made as to whether a MAG having a MAG memory data output line coupled to the CCRs and to a CBR is to send memory data to the CCRS, or is to reroute the memory data output to a CBR. Likewise, embodiments include a determination as to whether a MAG having a CBR coupled to its memory command signal input line, is to read a command signal from the CCRs or is to reroute such a read to read a memory command signal from the CBR. For example, FIG. 5 is a block diagram of MAGs between memories and CCRs and CBRs showing the data paths for the command signals and data signals, according to one embodiment of the invention. As shown in FIG. 5, all PEs 601 (e.g., such as PEs 0-6 described above) are coupled to CCR0 via all PEs to CCR0 write line 602 and all PEs to CCR read line 603. As described above, each PE is coupled to each CCR to read from and write to each CCR via reading from and writing to each PE's local address space as all CCRs are mapped into the local address space of each PE. Similarly, to lines 602 and 603 coupling all PEs 601 to CCR0, as described above, all PEs 601 are coupled to CCR1 611 via write line 604 and read line 605, CCR2 612 via write line 606 and read line 607, CCR3 613 via write line 608 and read line 609, CCR4 614 via write line 616 and read line 617, and CCR5 615 via write line 618 and read line 619.

Thus, as described above with respect to CCR interface 416 of FIG. 4, each CCR can act as a memory command register, or as a memory data output register with respect to MCH 227. For example, MAG0 440 is coupled via MAG0 memory command signal input line 620 to CCR0 610 which is acting as a memory command register. In addition, MAG0 is coupled via MAG0 memory data input/output (I/O) line 621 to MAG0 first bypass control circuit 625 which is coupled to CBR0 bypass input line 622 and MAG0 memory data to CCR I/O line 623. In one embodiment, line 621, circuit 625, and line 623 may also be part of or completely form a MAG0 memory data read/write line 421. Moreover, similar lines and circuits shown in FIGS. 5 and 6 for other MAGs may also be part of or form the memory data read/write lines of those MAGS. Hence, MAG0 can pass MAG0 memory data output to CCR1 611 via MAG0 memory data to CCR I/O line 623, and CCR1 611 will act as a memory data output register.

Alternatively, MAG0 first bypass control circuit 625 can reroute MAG0 memory data output to CBR0 bypass input line 622 which is coupled to CBR0 450. For example, bypass control circuit 625 can reroute a first set of MAG0 memory data output to CBR0 450 instead of routing the MAG0 memory data output to CCR1 611, via MAG0 memory data to CCR I/O line 623, if a bypass signal at or coupled to bypass control circuit 625 is activated.

Furthermore, CBR0 450 is coupled to MAG0 second bypass control circuit 635 via CBR0 bypass output line 630. Second bypass control circuit 635 may route a command signal input read by MAG1 to MAG1 memory command from CCR input line 634 or to read from CBR0 bypass output line 630. Thus, second bypass control circuit 635 may reroute a read on MAG1 memory command signal input line 632 to read a MAG1 memory command signal from CBR0 450 (e.g., such as data stored at CBR0 450 which may include MAG0 memory data output rerouted to CBR0 450 by first bypass control circuit 625), instead of reading a MAG1 memory command signal from CCR2 612 (e.g., CCR2 612 acting as a memory command register) via MAG1 memory command from CCR input line 634, if a second bypass signal at or coupled to second bypass control circuit 635 is active.

FIG. 5 also shows MAG0 440 coupled to memory 1 671 via MAG0 memory data read signal line 680 for addressing memory 1 671 to read data therefrom, and MAG0 memory data read data return line 681 for writing to MAG0 data returned from addresses read of memory 1 671. Memory 1 671 may be a memory such as memory 370, RAM 480, or any combination thereof. Features 641, 645, 642, 643, 451, 650, 655, 652, 654, and 442 may operate similar to corresponding features 621, 625, 622, 623, 450, 630, 635, 632, 634, and 441, successively, as described above. Moreover, structures 682 and 684 may act similar to structure 680, as described above; structures 683 and 685 may act similar to structure 681, as described above; and memories 672 and 673 may function similar to memory 671, as described above. In addition, memory 1 671 and memory 2 672, and/or memory 3 673 may be the same memory.

Therefore, as shown in FIG. 5, a first memory address generator (e.g., MAG0 440) may receive a first memory command signal (e.g., via MAG0 memory command signal input line 620) from a first memory command register (e.g., from CCR0 610), and retrieve a first set of memory data (e.g., via MAG0 memory data read data return line 681) from a first memory (e.g., memory 1 671) according to the first memory command signal. Then, a bypass register circuit (e.g., such as CBR0 450) may receive the first set of memory data (e.g., such as via CBR0 bypass input line 622) from the first memory address generator (e.g., MAG0 440) and provide access to the first set of memory data (e.g., such as via CBR0 bypass output line 630) by a second memory address generator (e.g., such as MAG1 441). More particularly, a first bypass control circuit (e.g., MAG0 first bypass control circuit 625) may reroute the first set of memory data to the bypass register (e.g., CBR0 450) instead of to one of a plurality of communication registers (e.g., such as CCR1 611 acting as a data register) (e.g., such as by rerouting the first set of memory data to CBR0 bypass input line 622 instead of routing the data to MAG0 memory data to CCR I/O line 623) if a first bypass signal is activated (e.g., such as by rerouting first sets of data for as long as a signal or bit at or provided to MAG0 first bypass control circuit 625 is activated; as will be described further below with respect to FIG. 6). Thus, as shown in FIG. 5, the first set of memory data can be directly rerouted to CBR0 450 instead of to all PEs 601, for as long as a first bypass signal or bit is activated (e.g., data can be directly rerouted by the first bypass control circuit to the bypass storage unit, such as CBR0, instead of to a processing element via a communication storage unit, such as CCR1).

Figure 6:
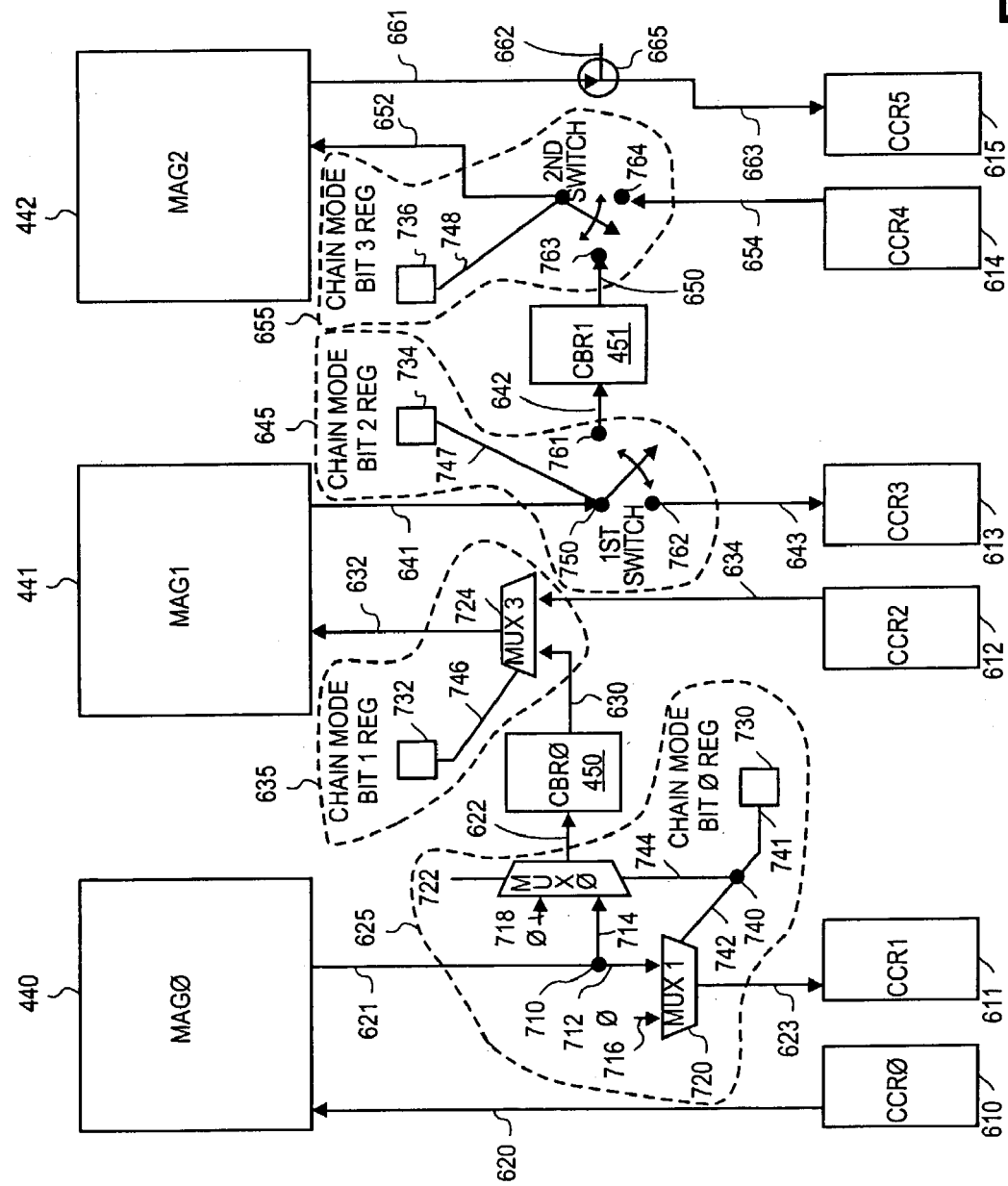
FIG. 6 is a block diagram of MAGs coupled to CCRs and CBRs, showing example switching structures for rerouting memory data to CBRs, according to one embodiment of the invention.

In addition, it is possible for a second bypass control circuit (e.g., such as MAG0 second bypass control circuit 635) to reroute a read (e.g., such as a command signal read on MAG1 memory command signal input line 632) by the second memory address generator (e.g., MAG1 441) to read the first set of memory data which is now stored in the bypass register circuit (e.g., such as CBR0 450) instead of reading data (e.g., such as a memory command signal on MAG1 memory command from CCR input line 634) from one of a plurality of communication registers (e.g., such as CCR2 612 acting as a command register) if a second bypass signal is activated (e.g., such as by rerouting reads for as long as a signal or bit at or provided to MAG0 second bypass control circuit 635 is activated; such as signal 746 described below with respect to FIG. 6). Thus, as shown in FIG. 5, the read operation by MAG1 can be directly rerouted to read the first set of memory data directly from CBR0 450, instead of reading data provided from all PEs 601 for as long as a second bypass signal or bit is activated (e.g., a second bypass control circuit can reroute a read operation by MAG1 to read the memory data directly from a bypass storage unit, such as CBR0, instead of reading data provided from a processing element, such as via CCR2).

In embodiments, an activated bypass signal may include a "high" signal (e.g., such as a logical "1"), a "low" signal (e.g., such as a logical "0"), or other asserted type of signal (e.g., such as in an analog signal, or logical tri-state environment signal) that can be interpreted by electronic circuitry such as control logic, logic gates, multiplexers, and/or registers, to distinguish that signal as compared to other signals received by that circuitry.

Hence, the second memory address generator (e.g., such as MAG1 441) may then retrieve a second set of memory data (e.g., such as by addressing a second set of memory data on MAG1 memory data read signal line 682 and retrieving a set of memory data corresponding to the addresses from memory 2 672 on MAG1 memory data read data return line 683) from a second memory (memory 2 672) according to a second memory command signal (e.g., received on MAG1 memory command signal input line 632) generated from the first set of memory data (e.g., such as the data read by MAG1 441 from CBR0 450). Note, that it is also possible for MAG1 441 to retrieve a second set of memory data according to a second memory command signal retrieved via CCR input line 634 and read by MAG1 from one of the CCRs (e.g., such as read from CCR2 612).

Moreover, for other MAGs and CBRs (e.g., such as MAG1 through MAG7, and CBR1 through CBR6, as shown in FIG. 4) similar structures to those mentioned above for MAG1 memory data output, MAG1 bypass control circuits, CBR1, and MAG2 memory command signal input line may function similarly to corresponding ones described above with respect to MAG0 440 and MAG1 441. Thus, it is possible to control whether or not the memory data output of a MAG, such as MAGn, will be routed to a data register or rerouted to a bypass register, and to control whether a subsequent MAG, such as MAGn+1, will read a memory command signal input from a command register or reroute a memory command signal input read to read from the same bypass register, by using bypass control circuitry and bypass signals. For instance, FIG. 6 is a block diagram of MAGs coupled to CCRs and CBRs, showing example switching structures for rerouting memory data to CBRs, according to one embodiment of the invention. As shown in FIG. 6, MAG0 first bypass control circuit 625 including chain mode bit-0 register 730 for providing MAG0 first bypass signal 741 to bypass signal node 740 so that the signal can be carried on first bypass signal to MUX 1 line 742 coupled to MUX 1 720, and carried on first bypass signal to MUX 0 line 744 coupled to MUX 0 722. Also coupled to MUX 1 720 is MAG0 MUX 1 active input 716 and MAG0 memory data output to MUX 1 inactive line 712. Similarly, coupled to MUX 0 722 is MAG0 MUX 0 inactive input 718 and MAG0 memory data output to MUX 0 active line 714. MAG0 memory data output node 710 splits MAG0 memory data I/O line 621 to line 712 and line 714.

Thus, if MAG0 first bypass signal 741 is active, the active signal on line 742 causes MUX 1 720 to select MUX 1 active input 716 and output a logical "0" on MAG0 memory data to CCR I/O line 623. In addition, if signal 744 is active it causes MUX 0 722 to pass a signal or data on MAG0 memory data output to MUX 0 active line 714 to CBR0 bypass input line 622. On the other hand, when MAG0 first bypass signal 741 is inactive, the inactive signal at signal 742 causes MUX1 720 to pass a signal or data on MAG0 memory data output to MUX1 inactive line 712 to MAG0 memory data to CCR I/O line 623, and the inactive signal at signal 744 causes MUX0 722 to pass a logical "0" at MAG0 MUX0 inactive input 718 to CBR0 bypass input line 622.

In other words, since the MAG0 memory data I/O line 621 is split to line 712 and line 714 at node 710, an active signal at signal 741 basically causes the MAG0 memory output data to be routed directly to line 622 but not to line 623; and an inactive signal at signal 741 causes the MAG0 memory output data to be routed to line 623 but not to line 622. Although FIG. 6 shows MAG0 memory output data rerouted via circuitry 625 from line 621 to line 622 and CBR0, in embodiments, such routing by circuitry 625 is described as rerouting the memory data "directly" to the bypass storage unit (e.g., CBR0) because the memory data is not routed to a PE or other signal processor, such as via a CCR or communication storage unit.

In the embodiment shown in FIG. 6, first bypass signal 741 may be active or inactive depending on the status of chain mode bit-0 register 730. For example, when register 730 contains a set bit (e.g., such as a logical "1") first bypass signal 741 is active; contrarily, when register 730 contains a reset bit (e.g., such as a logical "0") bypass signal 741 is inactive. Moreover, according to embodiments, chain mode bit-0 register 730 may be located externally to bypass control circuit 625, such as by including register 730 as a register in a memory address generator, such as MAG0 440, and providing signal 741 to first bypass control circuit 625 from that MAG. Also register 730 may have more than one bit location.

FIG. 6 also shows MAG0 second bypass control circuit 635 including MAG0 second bypass signal 746 coupled to MAG0 MUX3 724. Also coupled to MUX3 724 are CBR0 bypass output line 630 coupled to MAG0 MUX3 active input and MAG0 memory command from CCR input line 634 coupled to MAG0 MUX3 inactive input. Thus, when signal 746 is active, MUX3 passes the signal or data at CBR0 bypass output line 630 directly to MAG1 memory command signal input line 632. Moreover, when signal 746 is active, MUX3 passes a signal on signal input line 632 directly to line 630. Hence, a read operation by MAG1 to read signal or data may be rerouted to read signal or data directly from CBR0 via line 630, instead of from line 632. On the other hand, when signal 746 is inactive, MUX3 724 passes a signal or data at MAG1 memory command from CCR input line 634 to MAG1 memory command signal input line 632. Similarly to as described above with respect to direct rerouting of MAG0 memory output data to line 622, although FIG. 6 shows circuitry 635 for rerouting a read operation by MAG1 to read data from CBR0 450, in embodiments, such routing by circuitry 635 is described as rerouting a read to read a set of memory data directly from a bypass storage unit (e.g., such as CBR0, instead of reading data provided from a processing element, such as from all PEs 601 via CCR2) because the read operation is not reading data provided by a PE or other signal processor, such as via a CCR, or communication storage unit.

Likewise, various embodiments include rerouting data "directly" to bypass storage units and rerouting read operations to read data "directly" from bypass storage units by rerouting data transmission and data read operations via circuitry including lines, nodes, logic circuitry, logic gates, multiplexers, switches, registers, and other circuitry that does not require that the data to be transmitted to a PE or computer processor or that the read operation to read data from a PE or computer processor.

In addition, as shown in the FIG. 6 embodiment, whether signal 746 is active or inactive may be determined by the status of chain mode bit-1 register 732. For instance, if register 732 contains a set bit (e.g., such as a logical "1") signal 746 is active; contrarily, if register 732 contains a reset bit (e.g., such as a logical "0") signal 746 is inactive. Moreover, register 732 may be located externally to second bypass control circuit 635, such as by locating register 732 within a MAG, such as MAG1 441, and providing signal 746 to second bypass control circuit 635 from that MAG.

In addition to first or second bypass control circuits including multiplexers, first and/or second bypass control circuits may also include switches to route signals. For example, FIG. 6 shows MAG1 first bypass control circuit 645 having MAG1 first bypass signal 747 coupled to MAG1 first switch 750. Switch 750 can switch between MAG1 first switch active node 761 and MAG1 first switch inactive node 762. Thus, when signal 747 is active, switch 750 switches signals on MAG1 memory data I/O line 641 to node 761 which is coupled to CBR1 bypass input line 642. On the other hand, when signal 747 is inactive switch 750 switches data on MAG1 memory data I/O line 641 to MAG1 first switch inactive node 762 which is coupled to MAG1 memory data to CCR I/O line 643. As described above with respect to chain mode bit-0 register 730, chain mode bit-2 register 734 controls signal 747 in a similar manner, and may be located externally to MAG1 first bypass control circuit 645, such as by being part of MAG1 441.

Furthermore, FIG. 6 shows MAG1 second bypass control circuit 655 including MAG1 second bypass signal 748 coupled to MAG1 second switch 752 for switching the output of switch 752 between MAG1 second switch active node 763 which is coupled to CBR1 bypass output line 650, and MAG1 second switch inactive node 764 which is coupled to MAG1 memory command from CCR input line 654. Thus, when signal 748 is active, switch 752 provides signals on CBR1 bypass output line 650 to MAG2 memory command signal input line 652. On the other hand, when signal 748 is inactive, switch 652 provides signals on MAG2 memory command from CCR input line 654 to MAG2 memory command input line 652. Moreover, signal 748 may be active or inactive depending on chain mode bit-3 register 736, similarly to as described above with respect to chain mode bit-0 register 730 activating and inactivating signal 741. Moreover, chain mode bit-3 register 736 may be located externally to MAG1 second bypass control circuit 655, such as by being located in MAG2 442.

Figure 7:
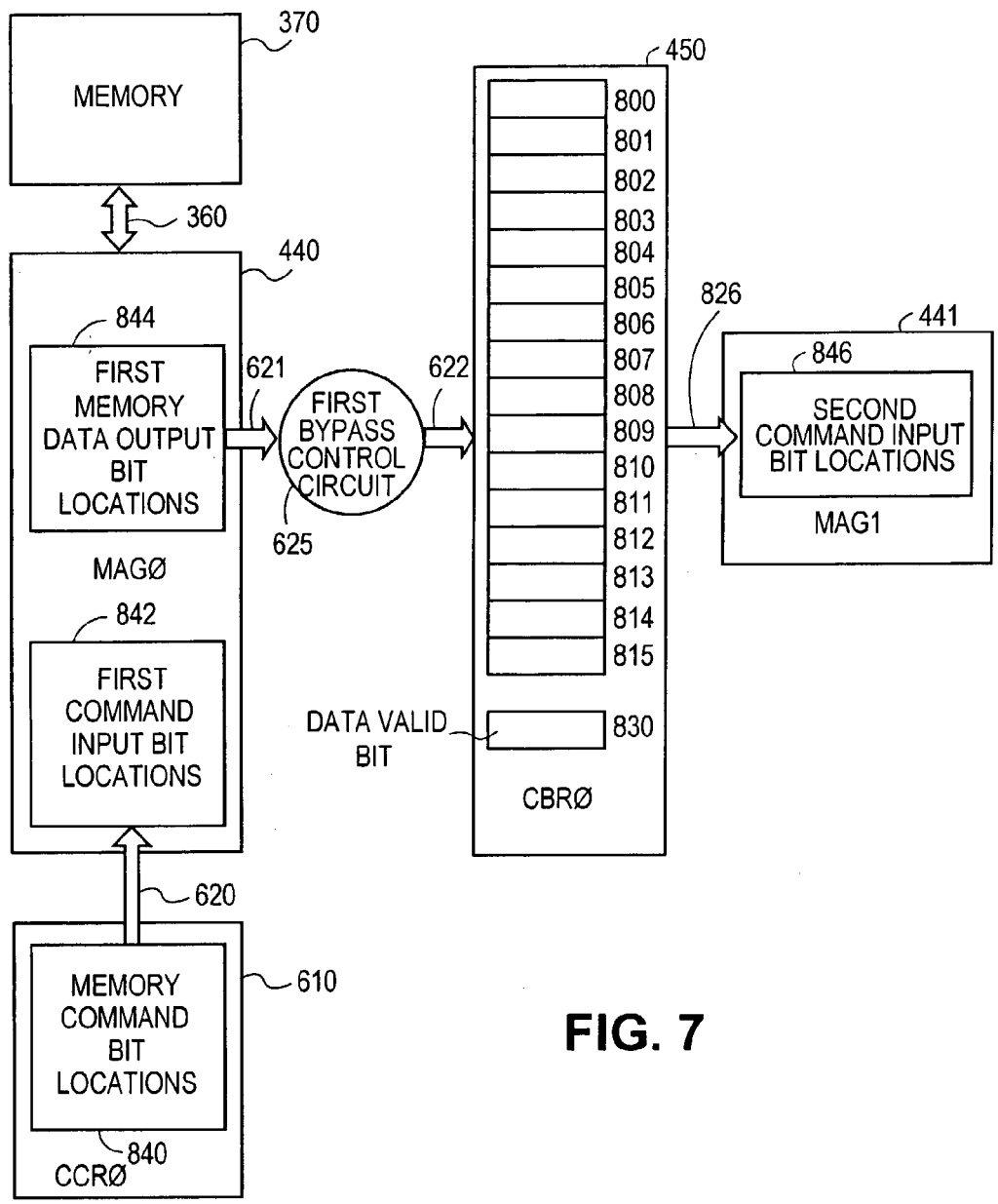
FIG. 7 is a register map of a CBR, according to one embodiment of the invention.

In addition to the circuitry shown in FIG. 6, various hardware (e.g., such as logic control circuitry, state machines, registers, and other appropriate circuitry known in the art) and software (e.g., such as program executable code for executing on a computer processor, code in ROM, and code in RAM) may be used to implement the structures shown in FIGS. 1-6, as described above. For example, FIG. 7 is a register map of a CBR, according to one embodiment of the invention. FIG. 7 shows a first memory command register (e.g., such as CCR0 610) having a plurality of memory command bit locations 840 and a first MAG (e.g., such as MAG0 440) having first plurality of command input bit locations 842 coupled via MAG0 memory command signal input line 620 to bit locations 840 and first plurality of memory data output bit locations 844 coupled to first bypass control circuit 625 via MAG0 memory data I/O line 621. MAG0 440 is also shown coupled to memory 370 via MCH memory coupling 360. Next, FIG. 7 shows CBR0 450 having a plurality of bypass bit locations 800-815 and data valid bit locations 830. Each of the plurality of bypass bit locations 800-815 may be coupled to one of each of the plurality of memory data output bit locations 844 of MAG0 440. In addition, each of a plurality of bypass bit locations 800-815 may also be coupled to each of second plurality of command input bit locations 846 of MAG1 441 via CBR0 to MAG1 command input bit locations coupling 826. For instance, coupling 826 may include structure performing the function of CBR0 bypass output line 630, MAG0 second bypass control circuit 635 and MAG1 memory command signal input line 632 as described above.

In addition, according to embodiments, CBR0 450 may have a data valid bit register 830 so that when data is loaded into bypass bit locations 800-815 (e.g., such as via line 622) a data valid bit in data valid bit register 830 is set (e.g., such as to a logical "1") until after the loaded data is read. Then, the data valid bit in register 830 may be reset (e.g., such as to a logical "0") after the data loaded into bypass bit locations 800-815 is read (e.g., such as by being read to second command input bit locations 846 of MAG1 441 via coupling 826).

The structures described above with respect to FIGS. 1-7 allow the CBRs to be used in any application that requires multi-level look ups, such as for video image processing or still image processing. For instance, a MAG implementing the CBRs is optimal for image processing algorithms, such as those for manipulating multiple dimensional arrays of data from memory in a variety of formats and dimensions. The power and flexibility in such a MAG is created by the various parameters that may be programmed by a PE through the CCRs to implement multiple-word commands to control the MAG (e.g., such as via a sixteen bit data path with an encoding for the commands) to allow for efficient implementation of look up tables of data addresses for obtaining data, such as data in multi-dimensional arrays. Specifically, a MAG including CBRs as described above in FIGS. 1-7, can implement a look up table by a PE writing the look up table input data to the command CCR of a MAG to command that MAG to access the look up table data locations having a second set of memory retrieval commands and passing the second set of memory retrieval commands via a CBR to the memory command input of a second MAG.

Specifically, in addition to the structures described above with respect to FIGS. 1-7, in embodiments, a MAG has flexibility for such look up table implementation through the use of several offset registers, pointers, etc. For example, a MAG may contain a Mask Register, Data Path DV Bit Register, Data Path DV Bits Register, Base Offset Register, Memory Pointer Register, two increment Registers, Operation Complete Register, and various control bits. Moreover, encoding for memory command signal input can be designed to allow for a maximum number of bits for parameters such as by using a Read Immediate command encoded as "00" in the first two bits of the sixteen bit data path, thus leaving the next fourteen bits for memory command signal input read addresses, included in the command. Moreover, this encoding also allows a look up table to be implemented simply by writing the look up table memory address desired to be read as the Read Immediate command. For example, writing a "0057h" to a command CCR (e.g., such as the CCR0) will cause a Read Immediate to location 0057h in memory (e.g., such as RAM 480), which would return a memory data output from the address associated with that input value. Moreover, the Base Offset Register can be used to offset a look up table address. Finally, other commands that do not need as many bits of parameter data can be encoded with longer sections of command bits. For example, the Set Read Operation Complete register needs only nine bits of parameter data and, thus bits nine through fifteen can be used for command encoding.

According to embodiments, Table 1 is an example memory address generator command encoding for indirect memory addressing of two dimensional patterns in RAM, where shaded areas show fixed values for various command encoding.

TABLE I

Example Memory Address Generator Command Encoding

| 15 | 14 | 13 | 12 | 11 | 10 | 9 | 8-0 | Command | Description |
|----|----|----|----|----|----|---|-----|---------|-------------|
| 0 | 0 | X | X | X | X | X | X | Read Immediate (MRI) | Read RAM from specified address |
| 1 | 0 | X | X | X | X | X | X | Write Immediate (MWI) | Write RAM from the Data CCR to a specified RAM address |
| 0 | 1 | 0 | X | X | X | X | X | Read Indirect, N Words (MR) | Read N Words into the Data CCR using the MAG memory pointer |
| 0 | 1 | 1 | X | X | X | X | X | Write Indirect, N Words (MR) | Write N Words from the Data CCR using the MAG memory pointer |
| 1 | 1 | 0 | 0 | 0 | X | X | X | Set/Reset Chain Mode Bit (CMB) | Toggles the Chain Mode Bit between Set and Reset |
| 1 | 1 | 0 | 0 | 1 | 0 | 0 | X | Set Read Operation Complete | |
| 1 | 1 | 0 | 1 | X | X | X | X | Set Increment Registers (MSINC) | Provides X and Y increment values for 1D or 2D addressing |
| 1 | 1 | 1 | 0 | 0 | X | X | X | Set Memory Pointer Register (MSMPR) | An initial offset value to be used in address calculations |
| 1 | 1 | 1 | 0 | 1 | X | X | X | Set Base Offset (MSBOR) | Sets the Base Offset register used in addressing |
| 1 | 1 | 1 | 1 | 0 | X | X | X | Write Mask Register | |
| 1 | 1 | 1 | 1 | 1 | X | X | X | Write First Use Registers | |

Thus, using the command encoding example shown above in Table 1, it is possible for a PE to access a variety of one dimensional, and predetermined patterns of multi-dimensionally patterned data addressed in the memory through the use of immediate addressing mode and indirect addressing mode. For example, data memory may be accessed in an immediate mode where the address is specified within the MCH read and write command (offset by the Write Base Offset Register) or in an indirect mode where the address is computed using a variety of values in a number of registers.

In immediate addressing mode, the MAGs use the Write Base Offset Register command along with the Read Immediate Register and Write Immediate Register commands to compute the address to be used for the RAM access (e.g., such as access to memory 370, memory 480, and/or any of memories 671-673). The following examples illustrate the address calculations based on the commands issued to the MCH where the register section is used as a reference for the fields used in the commands:

EXAMPLE 1

Base Offset Register=0x0100 (Set by 'Set Base Offset Register' Command)
Read Immediate Register=0x0004 (Set by 'Read Immediate' Command)
RAM address=0x0104

EXAMPLE 2

Base Offset Register=0x0800 (Set by 'Set Base Offset Register' Command)
Read Immediate Register=0x0010 (Set by 'Write Immediate' Command)
RAM address=0x0810

The indirect addressing mode is used to address predetermined patterns of multi-dimensionally patterned data addresses (e.g., such as shown below in FIG. 8) in RAM (e.g., such as memory 370, memory 480, and/or any of memories 671-673) by automatically modifying the addresses to RAM based on various values in register fields. Indirect addressing mode requires that at least one MAG of the MCH be programmed according to a MAG command setup, such as by processing the following commands before a memory read or write command is executed by that MAG:

Set Memory Pointer Register—sets an internal MPR register in the MCH for address calculations.

Set Increment Register—provides two update values (X and Y) for matrix addressing.

Set Base Offset Register—sets a base value for all address calculations.

The indirect read or write command is sent to the CCR after the previous commands are processed by the MCH command interpreter. In general, the MPR (initial value is based on the Write Memory Pointer Register) is added to the base offset register to form the RAM address. After the RAM access, the MPR is post-modified based on three fields; First Update field, Second Update field (both located in the Set Increment Registers command) and the Use First Counter and Word Count (both located in the Read Indirect Command and Write Indirect Command) in the indirect read or write command.

Therefore, RAM address calculations using look up tables to access predetermined multi-dimensional patterns of addresses in RAM can be implemented. Such RAM address calculations can be described by address calculation pseudo-code. For instance, Table 2 is a RAM address calculation pseudo-code example for indirect memory addressing of two dimensional predetermined patterns of look up table of memory addresses. The code in Table 2 assumes no address masking, as described herein.

TABLE 2

RAM Address Calculation Pseudo-Code Example

```
RAM Address = MPR + Base Offset Register
If "Use First Counter" not 0
   RAM Address = RAM Address + First Update Field
   First Counter = First Counter − 1
Otherwise
   RAM Address = RAM Address + Second Update Field
```

The pseudo-code above can be repeated (e.g., such as according to a "For" loop) along with the RAM address update using the Second Update Field that will keep repeating until the Word Count value in the indirect read or write command is reached. For instance, Table 2 implies an indirect read/write that means that a "For" loop is implied. Thus, if you have an indirect read of N words, then the "For" loop of N iterations is implied. In addition, the Memory Pointer Register (MPR) is restored to the last-written value from the MPR field in the Write MPR command whenever a Read Indirect or Write Indirect command is issued. This action allows additional indirect commands to reuse the last MPR setting without having to rewrite it.

Figure 8:
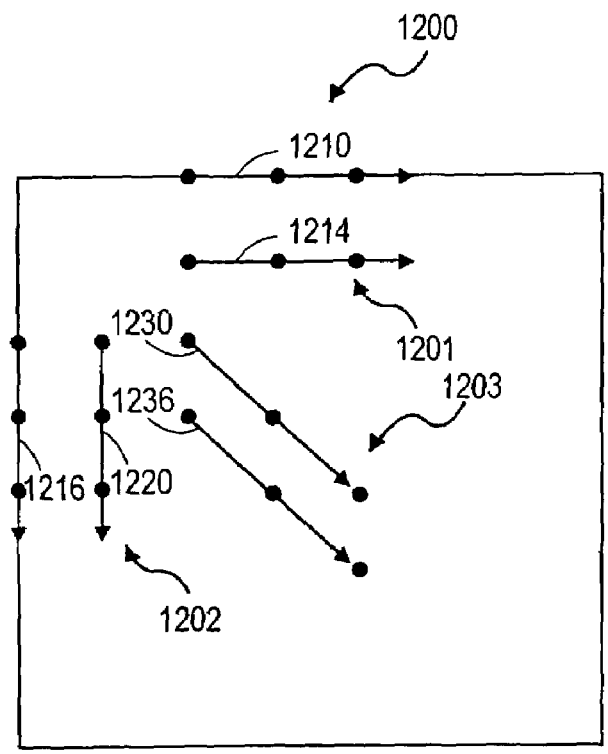
FIG. 8 shows example two dimensional patterns of locations in memory for forming a look up table of memory addresses, according to one embodiment of the invention.

Hence, according to the above MAG memory command encoding scheme (e.g., as shown in Table 1 and described in Table 2). Besides, the above encoding scheme it is possible to support arbitrary multi-dimensional access patterns, it is possible to provide memory data access patterns required for image processing, such as for video and still image processing. For example, FIG. 8 shows example predetermined two dimensional patterns of locations in memory for forming a pattern or look up table of memory addresses, according to one embodiment of the invention. FIG. 8 shows simple two dimensional access patterns such as horizontal access pattern 1201 for reading data (e.g., where each data location in memory is represented by a dot or ".") and horizontal locations along horizontal path 1210 and path 1214. FIG. 8 also shows vertical pattern 1202 for reading vertical data along vertical path 1216 and path 1220. Next, FIG. 8 shows diagonal pattern 1203 for reading data addresses in a diagonal pattern along diagonal path 1230 and path 1236.

Besides, the above encoding scheme in embodiments, it is possible to support arbitrary multi-dimensional access patterns of locations in memory by using more than one MAG. For example, more than one MAG can be used in order to read and write data into memory in multi-dimensional, or arbitrary patterns, such as a zig-zag pattern, inverse zig-zag pattern, JPEG derived pattern, or MPEG derived pattern of locations in memory, including patterns such as those shown in FIG. 9. Specifically, two MAGs (e.g., such as MAG0 440 and MAG1 441) may be coupled together via the CCRs in a back-to-back fashion (e.g., such as via a PE or CBR) to perform arbitrary data memory address access patterns read and writes. Thus, if a single CCR does not have the ability to receive memory data output from a MAG (e.g., by the CCR functioning as a memory data register) and return that same memory data output as a memory command signal (e.g., by that same CCR also by functioning as a command register), it is possible to incorporate an additional register set (e.g., such as a PE, or a CBR, as shown in FIGS. 4-7) to move multi-dimensional and arbitrary access pattern command signals read from memory by MAG1 as command input to MAG2. Moreover, according to embodiments, as described above, with respect to FIGS. 4-7, one or more CBRs can be used to quickly and efficiently pass multi-dimensional and arbitrary access pattern command signals read from memory by MAG1 as command input to MAG2.

For instance, in order to read sixty-four words stored in a zig-zag order of locations in memory (e.g., such as a JPEG sequence) it is possible to store in a look up table a second set of memory commands to read the sixty-four words stored in memory in zig-zag order of address locations. According to embodiments, a "look up table" can be a set of addresses in memory corresponding to data locations having the second set of memory commands (e.g., such as a second set of commands for reading the zig-zag pattern of address location in memory). Hence, a first MAG (e.g., MAG0 440) can be commanded (e.g., via memory command signal line 620) to retrieve data at the look up table of memory addresses that has the second memory commands (e.g., the data retrieved from the look up table addresses has commands to read the sixty-four words stored in a zig-zag order of address location in memory). Then, the second memory commands can be passed to a second MAG (e.g., such as by passing the second set of memory command signal to MAG1 441 via CBR0 450). Thus, the second MAG (e.g., MAG1 441) can retrieve the sixty-four words of data stored in a zig-zag order of address location in memory, in accordance with the second set of memory commands derived from the look up table read by the first MAG.

Figure 9:
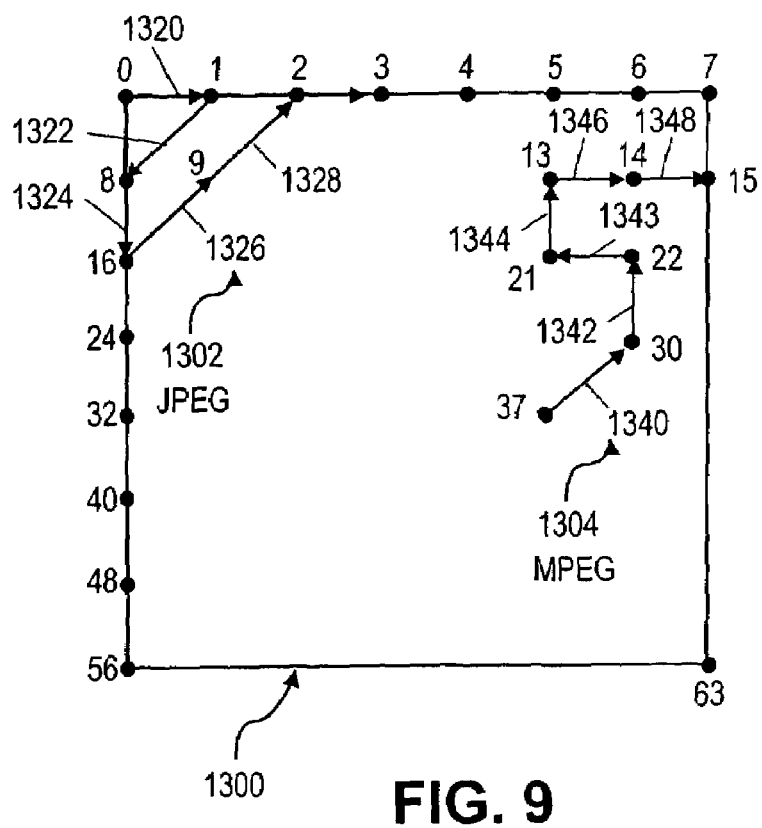
FIG. 9 shows Joint Photographic Experts Group (JPEG) and Moving Picture Experts Group (MPEG) examples of two dimensional patterns of locations in memory for forming a look up table of memory addresses, according to one embodiment of the invention.

More specifically, FIG. 9 shows JPEG and MPEG examples of two dimensional patterns of locations in memory forming look up tables of memory addresses, according to one embodiment of the invention. FIG. 9 shows sixty-four memory addresses for storing sixty-four words of data (e.g., addressed as 0 through 63, as shown by address numbers around the perimeter of FIG. 9 corresponding to locations in memory shown by "."s) in memory 1300. FIG. 9 also shows JPEG read pattern 1302 for reading data at JPEG sequence of addresses 0, 1, 8, 16, 9, 2, . . . . Thus, the words from memory 1300 can be read from addresses in zig-zag order by reading the data word at address 0, then following arrow 1320 to read data at address 1, then following arrow 1322 to read data at address 8, then arrow 1324 to read data at address 16, then arrow 1326 to read data at address 9, and arrow 1328 to read data at address 2, . . . . For instance, a look up table of first memory data having second memory command signals (e.g., such as to read the zig-zag JPEG pattern of addresses 1302, according to Table 3), can be read from memory by a first MAG and passed to a second MAG, as described above.

TABLE 3

Lookup Table of First Memory Data having Second Memory Commands

| Address | Data | Command |
|---|---|---|
| 100H | 00 00 000 000000000 | Memory Read Immediate 0 |
| 101H | 00 00 000 000000001 | Memory Read Immediate 1 |
| 102H | 00 00 000 000001000 | Memory Read Immediate 8 |
| 103H | 00 00 000 000010000 | Memory Read Immediate 16 |
| . . . | | |

More particularly, as shown in Table 3, sixteen bits of data at each of addresses 100H-103H in memory are read by a first MAG and that data, when passed to the command input of a second MAG (e.g., such as via a CBR), forms a second set of memory commands to Read Immediate the locations in accordance with JPEG zig-zag pattern 1302.

In addition, using the scheme described above, according to embodiments described herein, it is possible to read arbitrary patterns of data from memory. For instance, FIG. 9 also shows MPEG read pattern 1304 beginning at address 37 and following arrow 1340 to address 30, then following arrow 1342 to read address 22, following arrow 1343 to read address 21, following arrow 1344 to read address 13, following arrow 1346 to read address 14, and following arrow 1348 to read address 15. Such a pattern may be read using two MAGs, such as by storing a second set of commands to read the addresses as shown in pattern 1304, in a look up table of addresses in memory to be read by a first MAG. Subsequently, the first MAG can read the commands at the look up table of addresses in memory and pass the commands read from memory, such as via a bypass register, to a second MAG's command input. The second MAG can then read the addresses as shown in pattern 1304 from memory.

Furthermore, according to embodiments, once bypass signals are activated to use a CBR, each instance of rerouting data to and a read from the CBR (e.g., such as to retrieve a second set of memory data retrieved from memory according to commands provided by a first set of memory data indirectly read from memory) may continue until the bypass signals are deactivated.

For example, a first bypass signal (e.g., such as signal 741) may be activated by setting a first bit in a register (e.g., such as a bit in register 730) and a second bypass signal (e.g., such as signal 746) may be activated by setting a second bit in a register (e.g., such as register 732). Once the first and second bypass signals are activated, data read from memory by a first MAG (e.g., MAG0 440) can be bypassed to the command input line of a second MAG (e.g., MAG1 441).

Figure 10:
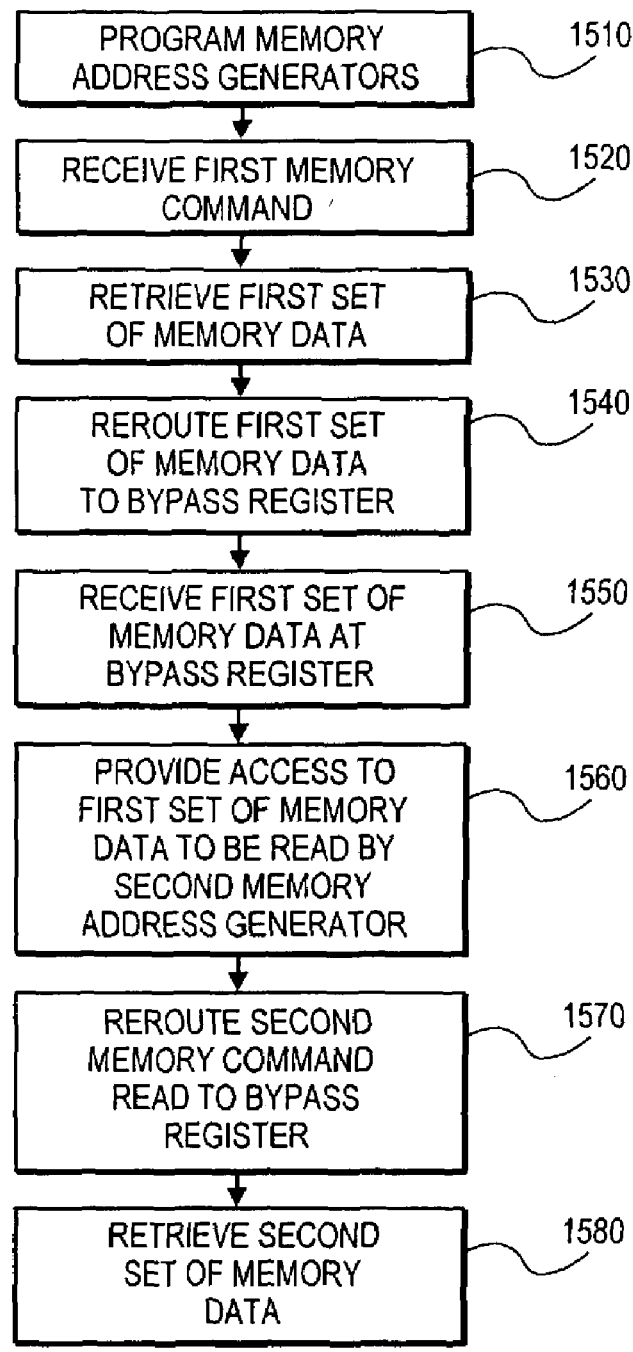
FIG. 10 is a flow diagram of a process for rerouting a first set of memory data to a CBR for use as a second memory command, according to one embodiment of the invention.

For instance, FIG. 10 is a flow diagram of a process for rerouting a first set of memory data to a CBR for use as a second memory command, according to one embodiment of the invention. At 1510, memory address generators of a first MAG (e.g., MAG0 440) may be programmed (e.g., such as is described above with respect to Tables 1-3) to indirectly retrieve a first set of data from memory in accordance with a memory command signal to be received (e.g., such as a command received from MAG0 memory command signal input line 620).

. At 1520, a first MAG (e.g., MAG0 440) receives a first memory command signal (e.g., such as via line 620) from a first memory command register (e.g., such as CCR0 610).

At 1530, a first set of memory data (e.g., such as data shown in Table 3 herein) is retrieved from a first memory (e.g., such as from memory 1 671 via line 681) according to the first memory command signal (e.g., signal received on line 620).

At 1540, transmission of the first set of memory data (e.g., such as transmission of data from Table 3 via line 621) is rerouted (e.g., such as via bypass circuit 625) to a bypass register circuit (e.g., such as CBR0 450) instead of being transmitted to one of a plurality of communication registers (e.g., such as instead of being transmitted to CCR1 611 via line 623), if a first bypass signal (e.g., such as signal 741) is activated.

At 1550, the first set of memory data (e.g., such as data shown in Table 3 is received at the bypass register circuit (e.g., such as received at CBR0 450 via line 622).

At 1560, access to the first set of memory data (e.g., the data from Table 3 now stored on CBR0 450) is provided to be read by a second memory address generator (e.g., such as to be read by MAG1 441 via line 632 through control circuit 635 to line 630).

In addition, at 1570, a read by the second memory address generator (e.g., a read by MAG1 441 via line 632) is rerouted (e.g., such as by control circuit 635, rerouting a read on line 632 to line 630 instead of line 634, in accordance with the second bypass signal as described above) to read the first set of memory data (e.g., such as data shown in Table 3 and now stored at CBR0 450) instead of reading data from one of the plurality of communication registers (e.g., such as instead of reading data from CCR2 612 via line 634), if a second bypass signal is activated (e.g., such as signal 746). Moreover, at 1570, a data valid bit register in the bypass register circuit (e.g., such as a bit in register 830 in CBR0 450) may be set when data is loaded into the bypass register circuit (e.g., such as when data is loaded into bit locations 800-815 of CBR0 450), and reset (e.g., such as by resetting a bit in register 830) after the data loaded into the bypass registers has been read (e.g., such as after data in bit locations 800-815 has been read by MAG1 441).

In addition, according to embodiments, a second memory command signal to access a second pattern of data from a second memory (e.g., such as a memory command signal at MAG1 441 for accessing a pattern of data from memory 2 672 via addressing line 682 and data return line 683) is generated from the first set of memory data (e.g., such as generating memory read commands shown in Command column of Table 3 from Data column of Table 3). For instance, any of the bypass signal activation or deactivation (e.g., such as is described above at 1505), memory address generator programming (e.g., such as is described above at 1510), or memory commands (e.g., as described above at 1520), or all of the above may be included in a second memory command signal, read by second MAG and used to access a second pattern of data from a second memory (e.g., such as being received by MAG1 441 via line 632, circuit 635, and line 630, from CBR0 450).

Thus, the second memory address generator (MAG1 441) may retrieve a second set of memory data from a second memory (e.g., such as MAG1 441 retrieving data from memory 2 672 via addressing line 682 and data return line 683) according to a second memory command signal associated with the first set of memory data (e.g., according to commands in the Command column of Table 3 generated from data in the Data column of Table 3). In an embodiment in accordance with Table 3, and as described above with respect to Table 1 and Table 2, data in the Data column of Table 3 retrieved from memory by a first MAG (e.g., such as MAG0 440) is the second set of commands to command a second MAG to retrieve a second set of data from a second memory (e.g., to command MAG1 441 to retrieve data from memory 2 672) without any further processing or manipulation of the data shown in Table 3. This is because, as shown in Table 1, the memory Read Immediate command bit encoding simply requires that bits fifteen and fourteen be logical "0"'s and the remaining fourteen bits may specify an address in memory to be read. However, according to embodiments, it is also possible for the first set of memory data to include commands other than those shown in Table 3, such as other commands in accordance with Table 1, in order to program the second MAG as desired. For example, a Write Immediate command having bit fifteen set to logical "1" may be received which will cause the second MAG to write to an address in the second memory.

Ultimately, the first and second bypass signals may be deactivated. For example, the first bypass signal (e.g., signal 741) may be deactivated by resetting the first bit in a register (e.g., such as register 730) and the second bypass signal (e.g., signal 746) may be deactivated by resetting the second bit in a register (e.g., by resetting to logical "0" the bit in register 732).

Finally, Table 4 shows the relationship between clock cycles and first and second memory reads by the MCH, in an embodiment, such as the one according to FIG. 10, as described above, once bypass signals are activated, and memory address generators are programmed, such as described above at Tables 1 and 2. For instance, once 1510 is accomplished, each MAG read occurs in association with the following subsequent clock cycle count, as shown in Table 4. During the first subsequent clock cycle, MAG0 441 reads the first memory command signal via line 620 and issues a first read request via line 680 to memory 1 671. Then, during the second clock cycle, MAG0 441 writes the first data read from memory 1 671 received via line 681 (e.g., such as data shown in Table 3 having second memory command signals shown in Table 3) to CBR0 450. During the third clock cycle, MAG1 441 reads the data stored in CBR0 450 (e.g., including the second memory command signal stored in CBR0) and issues a second read request to memory 2 672 via line 682. During the fourth clock cycle, MAG1 441 writes the second data read from memory 2 672 via line 683 to CCR3 613 via line 643. During the fifth clock cycle, the second data read from memory 2 672 is available from CCR3 613 to one or more destination processing elements (PEs) for consumption.

Alternatively, in embodiments, it is possible during the fourth clock for MAG1 441 cycle to write the second data read out from memory to CBR1 451 instead of to CCR3 613, thus providing the second data read from memory to MAG2 command input. If the second data read from memory contains a third memory command signal, this embodiment allows for a three dimensional read of memory 3 673 by MAG2 442.

TABLE 4

1st and 2nd Memory Read Clock Cycles

| Clock Cycle | Operation |
|---|---|
| 1 | MAG0 reads the 1st memory command signal and issues a 1st read request to memory. |
| 2 | MAG0 writes the 1st data read out from memory (2nd memory command signal) to CBR. |
| 3 | MAG1 reads the 2nd memory command signal and issues a 2nd read request to memory. |
| 4 | MAG1 writes the 2nd data read out from memory to CCR3. |
| 5 | 2nd data is available to destination Processing Element for consumption. |

The invention is described with reference to specific embodiments thereof. However, it will be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. An apparatus comprising:
 a first memory address generator to receive a first memory command signal and to retrieve a first set of memory data from a first memory according to the first memory command signal;
 a bypass storage unit to receive the first set of memory data from the first memory address generator and provide access to the first set of memory data by a second memory address generator;
 a first bypass control circuit to reroute the first set of memory data directly to the bypass storage unit, instead of to a processing element, while a first bypass signal is activated; and
 a second bypass control circuit to reroute a read operation by the second memory address generator to read the first set of memory data directly from the bypass storage unit, instead of reading data provided from a processing element, while a second bypass signal is activated,
 wherein the second memory address generator comprises circuitry to retrieve a second set of memory data from a second memory according to a second memory command signal generated from the first set of memory data.

2. The apparatus of claim 1, wherein the first bypass control circuit is to reroute the first set of memory data until a memory command signal deactivates a first bypass signal, wherein the second bypass control circuit is to reroute a read operation by the second memory address generator until a memory command signal deactivates a second bypass signal, and wherein the second memory address generator comprises circuitry to retrieve a second set of memory data according to a second memory command signal included in the first set of memory data.

3. The apparatus of claim 1, wherein the second memory command signal is a plurality of memory commands derived from a lookup table of memory addresses to locations in said first memory, and the second set of memory data comprises a plurality of data retrieved from the second memory according to the plurality of memory commands derived from the lookup table.

4. The apparatus of claim 1, wherein the first memory is a same memory as the second memory.

5. The apparatus of claim 1, further comprising a digital signal processor including the at least one communication storage unit, each communication storage unit coupled to each of a plurality of programmable elements and coupled to a memory address generator.

6. The apparatus of claim 1, wherein the first memory command signal comprise one of a pattern of data addresses to locations in the first memory and a lookup table of data addresses to locations in the first memory.

7. The apparatus of claim 6, wherein a plurality of data entries in the first memory at the data addresses comprise a second set of encoded memory commands for retrieving a second pattern of data from a second memory.

8. The apparatus of claim 1, wherein the first memory command signal is to be received from a first communication storage unit acting as a memory command register.

9. The apparatus of claim 5, wherein each of the at least one communication storage units comprise one of a communication register, a memory command register, a command input register, a data output register, and a register having a plurality of bit locations.

10. The apparatus of claim 1, wherein the bypass storage unit comprises one of a bypass register, a register having a plurality of bit locations.

11. The apparatus of claim 2, wherein each of the first bypass control circuit and the second bypass control circuit comprises one of a multiplexer and a switch.

12. The apparatus of claim 2, wherein the first bypass signal comprises a first bit set at the first memory address generator, and the second bypass signal comprises a second bit set at the second memory address generator.

13. The apparatus of claim 1, wherein the bypass storage unit comprises a data valid bit which is set when data is loaded into the bypass storage unit and reset after the data loaded into the bypass storage unit is read.

14. A system comprising:
a double data rate random access memory;
a digital signal processor coupled to the double data rate random access memory, the digital signal processor having a plurality of communication storage units, each communication storage unit coupled to a plurality of programmable elements; and
a memory command handler coupled to each of the plurality of communication storage units, the memory command handler comprising:
  a first memory address generator to receive a first memory command signal from a first of the plurality of communication storage units and to retrieve a first set of memory data from a memory according to the first memory command signal;
  a bypass storage unit to receive the first set of memory data from the first memory address generator and provide access to the first set of memory data by a second memory address generator;
  a first bypass control circuit to reroute the first set of memory data directly to the bypass storage unit, instead of to a second of the plurality of communication storage units, while a first bypass signal is activated; and
  a second bypass control circuit to reroute a read operation by the second memory address generator to read the first set of memory data directly from the bypass storage unit, instead of reading data from a third of the plurality of communication storage units, while a second bypass signal is activated,
  wherein the second memory address generator comprises circuitry to retrieve a second set of memory data from the memory according to a second memory command signal generated from the first set of memory data.

15. The system of claim 14, wherein the second memory command signal is a plurality of memory commands derived from a lookup table of memory addresses to locations in said memory, and the second set of memory data comprises a plurality of data retrieved from the memory according to the plurality of memory commands derived from the lookup table.

16. A method comprising:
receiving a first memory command signal at a first memory address generator;
retrieving a first set of memory data from a first memory according to the first memory command signal;
rerouting transmission of the first set of memory data directly to a bypass storage unit, instead of to a processing element, while a first bypass signal is activated;
receiving the first set of memory data at the bypass storage unit;
providing access to the first set of memory data to a second memory address generator;
rerouting a read operation by the second memory address generator to read the first set of memory data directly from the bypass storage unit, instead of reading data provided from a processing element, while a second bypass signal is activated; and
the second memory address generator retrieving a second set of memory data from a second memory according to a second memory command signal associated with the first set of memory data.

17. The method of claim 16, further comprising generating a second memory command signal to access a second pattern of data from a second memory from the first set of memory data.

18. The method of claim 16, wherein the first memory command signal is received from a first communication storage unit acting as a memory command register.

19. The method of claim 16, wherein the first set of memory data comprises a second set of memory commands and wherein the second memory command signal comprises the second set of memory commands.

20. The method of claim 16, wherein the first memory is a same memory as the second memory.

21. The method of claim 16, wherein retrieving a first set of memory data comprises retrieving the first set of memory data from one of a pattern of data addresses to locations in the first memory and a lookup table of data addresses to locations in the first memory.

22. The method of claim 16, further comprising activating the first bypass signal by setting a first bit at the first memory address generator, and activating the second bypass signal by setting a second bit at the second memory address generator.

23. The method of claim 21, further comprising deactivating the first bypass signal by resetting the first bit at the first memory address generator, and deactivating the second bypass signal by resetting the second bit at the second memory address generator.

24. The method of claim 16, further comprising setting a data valid bit at the bypass storage unit when data is loaded into the bypass storage unit and resetting the data valid bit after the data loaded into the bypass storage unit is done being read.

25. The method of claim 16, further comprising programming the first memory address generator to indirectly retrieve the first set of memory data according to the first memory command.

26. A method comprising:
receiving a first memory command signal at a first memory address generator;
retrieving a first set of memory data from a first memory according to the first memory command signal;
rerouting transmission of the first set of memory data directly to a bypass storage unit, instead of to a processing element, while a first bypass signal is activated;
receiving the first set of memory data at the bypass storage unit;
providing access to the first set of memory data to a second memory address generator;
activating a first bypass, a second bypass signal, a third bypass signal, and a fourth bypass signal to chain memory data received at a first memory address generator to a second memory address generator, and to chain memory data received at the second memory address generator to a third memory address generator;
rerouting a read operation by the second memory address generator to read the first set of memory data directly from the first bypass storage unit, instead of reading data provided from a processing element, while the second bypass signal is activated;
retrieving a second set of memory data from a second memory according to the first set of memory data;
rerouting transmission of the second set of memory data directly to a second bypass storage unit, instead of to a processing element, while the third bypass signal is activated;

receiving the second set of memory data at the second bypass storage unit; and rerouting a read operation by the third memory address generator to read the second set of memory data directly from the second bypass storage unit, instead of reading data provided from a processing element, while the fourth bypass signal is activated.

27. The method of claim 26, further comprising:

activating the first bypass signal by setting a first bit at the first memory address generator, activating the second bypass signal by setting a second bit at the second memory address generator, activating the third bypass signal by setting a third bit at the second memory address generator, and activating the fourth bypass signal by setting a fourth bit at the third memory address generator.

28. The method of claim 26, further comprising:

after rerouting the read operation by the third memory address generator, deactivating the first bypass signal by resetting the first bit at the first memory address generator, deactivating the second bypass signal by resetting the second bit at the second memory address generator, deactivating the third bypass signal by resetting the third bit at the second memory address generator, and deactivating the fourth bypass signal by resetting the fourth bit at the third memory address generator.

* * * * *